US008746567B2

(12) United States Patent
Kitagawa (10) Patent No.: US 8,746,567 B2
(45) Date of Patent: Jun. 10, 2014

(54) BARCODE READER AND COMPUTER PROGRAM PRODUCT (75) Inventor: Toru Kitagawa, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/355,703

(22) Filed: Jan. 23, 2012

(65) Prior Publication Data
US 2012/0199656 A1 Aug. 9, 2012

(30) Foreign Application Priority Data

Feb. 4, 2011 (JP) ................................. 2011-022690

(51) Int. Cl.
G06K 7/10 (2006.01)

(52) U.S. Cl.
USPC ............ 235/462.16; 235/462.01; 235/462.08; 235/462.25

(58) Field of Classification Search
USPC .............. 235/435, 454, 470, 472.01, 462.01, 235/462.08, 462.12, 462.16, 462.25, 462.41
See application file for complete search history.

(56) References Cited

U.S. PATENT DOCUMENTS

| 4,782,220 | A | * | 11/1988 | Shuren | 235/462.18 |
|---|---|---|---|---|---|
| 5,115,121 | A | * | 5/1992 | Bianco et al. | 235/462.25 |
| 5,412,198 | A | * | 5/1995 | Dvorkis | 235/472.01 |
| 5,479,000 | A | * | 12/1995 | Dvorkis et al. | 235/472.01 |
| 5,900,617 | A | * | 5/1999 | Dvorkis et al. | 235/472.01 |
| 6,234,396 | B1 | * | 5/2001 | Tawara | 235/472.01 |
| 6,237,850 | B1 | * | 5/2001 | Kito | 235/462.08 |
| 6,796,503 | B1 | * | 9/2004 | Fabian et al. | 235/462.01 |
| 6,969,005 | B2 | * | 11/2005 | Otsubo | 235/462.33 |
| 7,212,682 | B2 | * | 5/2007 | Bian et al | 382/254 |
| 7,628,331 | B2 | * | 12/2009 | Madej | 235/462.32 |
| 8,146,818 | B2 | * | 4/2012 | Nakamura | 235/462.06 |
| 2002/0104885 | A1 | * | 8/2002 | Tanioka et al. | 235/462.33 |
| 2007/0069027 | A1 | * | 3/2007 | Madej | 235/462.32 |
| 2009/0242643 | A1 | * | 10/2009 | Nakamura | 235/462.06 |
| 2011/0075931 | A1 | * | 3/2011 | Chiou et al. | 382/190 |
| 2011/0309138 | A1 | * | 12/2011 | Wu et al. | 235/375 |

FOREIGN PATENT DOCUMENTS

JP 06-290294 A 10/1994

* cited by examiner

Primary Examiner — Paultep Savusdiphol
(74) Attorney, Agent, or Firm — Holtz, Holtz, Goodman + Chick, PC (57) ABSTRACT Disclosed is a barcode reader, comprising: a scanner unit which scans a barcode by emitting laser beam and receiving reflection light thereof to obtain image data; a judgment unit which judges a portion of the image data corresponding to each end portion of a swing width of the laser beam as a data unstable range and judges a portion of the image data other than the data unstable range as a data stable range; and a decoding unit which sets a tolerance of error of the image data low against a threshold in the data unstable range, the threshold being used to judge data width of black bars and white spaces of the barcode, to decode the data unstable range, and sets the tolerance of error of the image data high against the threshold in the data stable range to decode the data stable range.

9 Claims, 9 Drawing Sheets

BARCODE READER AND COMPUTER PROGRAM PRODUCT

CROSS-REFERENCE TO RELATED APPLICATIONS

This application is based upon and claims the benefit of priority from the prior Japanese Patent Application No. 2011-022690, filed on Feb. 4, 2011, the entire contents of which are incorporated herein by reference.

BACKGROUND OF THE INVENTION

1. Field of the Invention

The invention relates to a barcode reader and a computer program product.

2. Description of Related Art

Some conventionally-known barcode readers use a laser beam to scan a one-dimensional barcode. Such a barcode reader scans a barcode by emitting and swinging a laser beam in a cross direction, receiving the beam reflected on the barcode to obtain image data, and decoding the image data using a predetermined threshold. The image data has a data structure in which obtained data widths of black bars and data widths of white spaces are sequentially (alternately) arranged according to the image of the barcode. The predetermined threshold is a threshold to determine the data widths (thicknesses) of the black bars and white spaces.

The threshold used to decode image data is previously set according to the type of the barcode reader, the optical system (lens magnification), bar thickness, and the like. In another known barcode reader, the threshold used to decode image data can be externally inputted and set to be changed (see Japanese Patent Laid-open Publication No. H6-290294, for example).

However, according to the conventional barcode readers, the reflected light may not be enough at each end of the swing width (irradiation width) of the laser beam in some cases. The obtained image data is therefore unstable, and the proportions of black bars and white spaces may not be correctly obtained. Accordingly, when the barcode is scanned by the both ends of the swing width of the laser beam, the proportions of the black bars and white spaces look broken. Decoding such image data may result in misreading.

One of the methods to prevent misreading in the conventional barcode readers is tight adjustment of the threshold. The tight adjustment of the threshold refers to adjusting and lowering the tolerance of error of the image data against the threshold.

However, if the threshold is simply adjusted tightly, the threshold serves tightly at reading of scanned data in central part of the swing width of the laser beam where the proportions of black bars and white spaces are correct. Accordingly, reading may not be executed in the case where the proportions of printed black bars and white spaces of the same width include even a little error, the case where the barcode reader is distant from the barcode, and the like.

SUMMARY OF THE INVENTION

An object of the invention is to improve the accuracy and response of barcode reading.

According to an aspect of the present invention, there is provided a barcode reader, comprising:

a scanner unit which scans a barcode by emitting laser beam and receiving reflection light of the emitted laser beam to obtain image data;

a judgment unit which judges a portion of the image data obtained by the scanner unit corresponding to each end portion of a swing width of the laser beam as a data unstable range and judges a portion of the image data other than the data unstable range as a data stable range; and a decoding unit which sets a tolerance of error of the image data low against a threshold in the data unstable range judged by the judgment unit, the threshold being used to judge data width of black bars and white spaces of the barcode, to decode the data unstable range using the threshold and the tolerance, and sets the tolerance of error of the image data high against the threshold in the data stable range judged by the judgment unit to decode the data stable range using the threshold and the tolerance.

According to another aspect of the present invention, there is provided a computer program product which is readable by a computer used in a barcode reader and encodes an instruction to execute computer processing, the computer processing comprising the steps of:

scanning a barcode by emitting laser beam and receiving reflection light of the emitted laser beam to obtain image data;

judging a portion of the image data obtained by the scanning corresponding to each end portion of a swing width of the laser beam as a data unstable range, and judging a portion of the image data other than the data unstable range as a data stable range; and setting a tolerance of error of the image data low against a threshold in the data unstable ranges judged by the judging, the threshold being used to judge data widths of black bars and white spaces of the barcode, to decode the data unstable range using the threshold and the tolerance, and setting the tolerance of error of the image data high against the threshold in the data stable range judged by the judging to decode the data stable range using the threshold and the tolerance.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENT

Hereinafter, a description is given of an embodiment according to the invention in detail with reference to the attached drawings. The invention is not limited by examples shown in the drawings.

Figure 1:
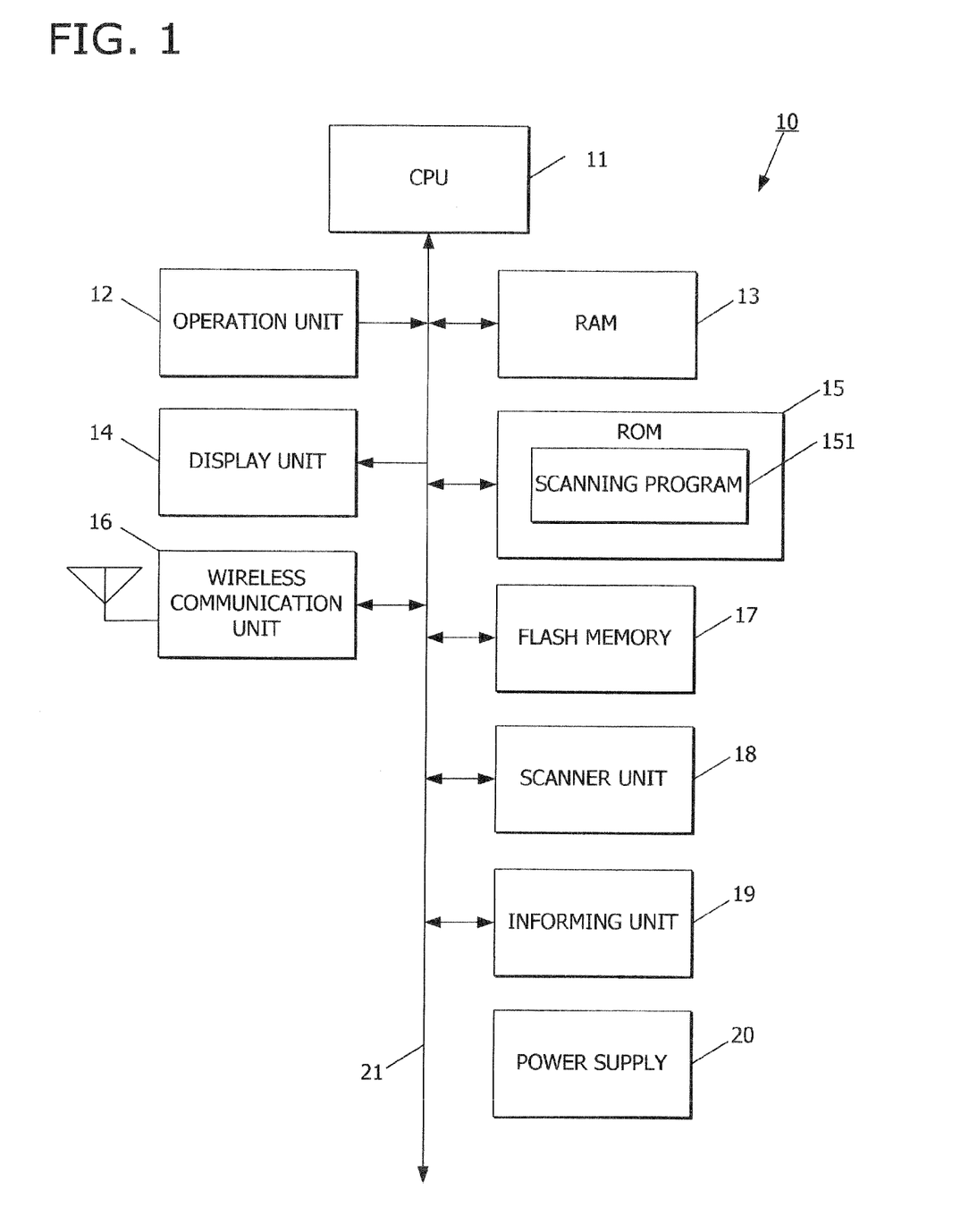
FIG. 1 is a block diagram illustrating a configuration of a barcode reader of an embodiment of the invention.
Figure 2:
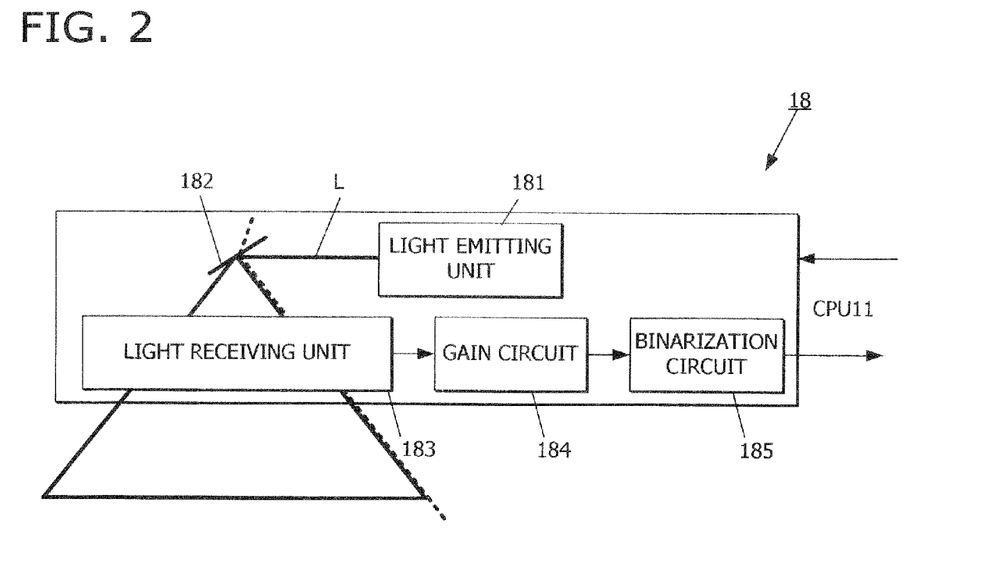
FIG. 2 is a block diagram illustrating a configuration of a scanner unit.

First, a description is given of a device configuration of the embodiment with reference to FIGS. 1 and 2.

FIG. 1 is a block diagram illustrating a configuration of a barcode reader 10 of this embodiment.

FIG. 2 is a block diagram illustrating the configuration of the scanner unit 18.

As shown in FIG. 1, a barcode reader 10 of this embodiment is a handy terminal which reads and manages one-dimensional barcodes as reading targets. The barcode reader 10 is used in warehouses, retailing shops, and the like, for example. The barcodes are assumed to be attached to goods placed in storages, shops, and the like.

The barcode reader 10 includes a CPU (central processing unit) 11, an operation unit 12, a RAM (random access memory) 13, a display unit 14, a ROM (read only memory) 15, a wireless communication unit 16, a flash memory 17, a scanner unit 18, an informing unit 19, and a power supply 20. The units of the barcode reader 10 except the power supply 20 are connected through a bus 21.

The CPU 11 controls each unit of the barcode reader 10. The CPU 11 reads out a specified program among various programs from the ROM 15 and expands the read out program in the RAM 13, thereby executes various processes in cooperation with the expanded program.

According to a scanning program 151, the CPU 11 judges a part of the image data obtained by the scanner unit 18 corresponding to each end portion of the swing width of a laser beam to be a data unstable range, and judges a central part of the same, which is not included in the data unstable ranges, to be a data stable range. The CPU 11 sets the tolerance of error of image data low against a threshold for the judged data unstable range, the threshold being used to judge data widths of black bars and white spaces of the barcode, and uses the threshold and the tolerance of error to decode the data unstable range. The CPU 11 sets the tolerance of error of image data high against the threshold and uses the threshold and the tolerance of error to decode the data stable range.

The operation unit 12 includes a key group composed of various keys such as character input keys and outputs to the CPU 11, operation information according to an input of each key pressed by a user. The operation unit 12 includes at least a trigger key for barcode scanning using the scanner unit 18.

The RAM 13 is a volatile semiconductor memory and includes a work area which stores various data and various programs.

The display unit 14 is a display unit including a display panel such as a LCD (liquid crystal display) and EL (electroluminescent) display. The display unit 14 performs various displays on the display panel according to display information inputted from the CPU 11.

The ROM 15 is a read-only semiconductor memory storing various data and programs. The ROM 15 stores the scanning program 151.

The wireless communication unit 16 is a wireless communication unit of a mobile phone communication system. The wireless communication unit 16 includes an antenna, a modulator, a demodulator, a signal processing unit, and the like and is configured to perform wireless communication with a base station. The wireless communication unit 16 performs signal processing for a signal of information intended to be transmitted at the signal processing unit, modulates the signal at the modulator, and transmits the modulated signal through the antenna to the base station as a radio wave. The base station is connected to a communication destination device through a communication network. The wireless communication unit 16 moreover demodulates a received signal of a radio wave received from the base station through the antenna at the demodulator and performs signal processing for the demodulated signal at the signal processing, thus obtaining received information. In such a manner, the wireless communication unit 16 communicates with the communication destination device via the base station. Moreover, the wireless communication unit 16 may be composed of a wireless LAN (local area network) type wireless communication unit and may be configured to communicate with the communication destination device through an access point.

The flash memory 17 is a non-volatile semiconductor memory which stores information in a readable and writable manner.

The scanner unit 18 is configured to scan a one-dimensional barcode according to a control signal by the CPU 11 to obtain image data of the barcode and output the image data to the CPU 11. As shown in FIG. 2, the scanner unit 18 includes a light emitting unit 181, a vibration mirror 182, a light receiving unit 183, a gain circuit 184, and a binarization circuit 185.

The light emitting unit 181 emits and outputs a laser beam L. The vibration mirror 182 is vibrated by a motor (not shown) or the like according to a control signal of the CPU 11 to reflect and expand the laser beam L outputted from the light emitting unit 181 from side to side. The laser beam L reflected on the vibration mirror 182 actually hits a reading target (a barcode) and is reflected. The light receiving unit 183 is a module configured to receive the reflection light thereof and convert the received light to an electric signal.

The gain circuit 184 is configured to amplify the electric signal of the reflection light received by the light receiving unit 183 to optimize the waveform. The binarization circuit 185 is configured to convert the electric signal optimized by the gain circuit 184 to binary data as image data of the barcode and outputs the binary data to the CPU 11. The CPU 11 decodes the image data inputted from the binarization circuit 185.

The informing unit 19 is an informing unit configured to output buzzer sound according to the control of the CPU 11. The informing unit 19 is controlled so as to output the buzzer sound when the barcode scan is performed successfully.

The power supply 20 is a secondary battery such as a lithium battery and is configured to supply power to each unit of the barcode reader 10.

Next, a description is given of the operation of the barcode reader 10 with reference to FIGS. 3 to 9.

Figure 3:
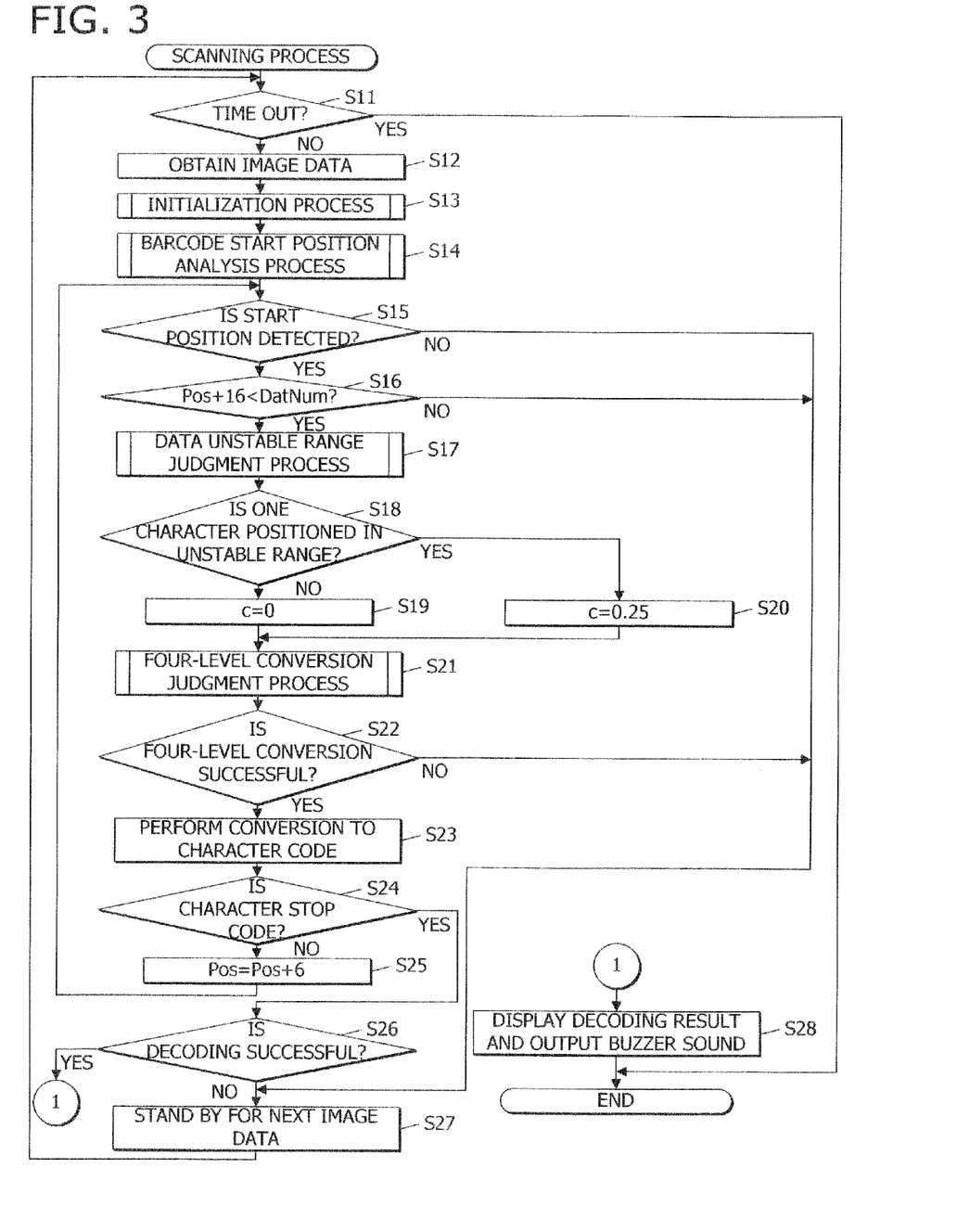
FIG. 3 is a flowchart showing a scanning process.
Figure 4:
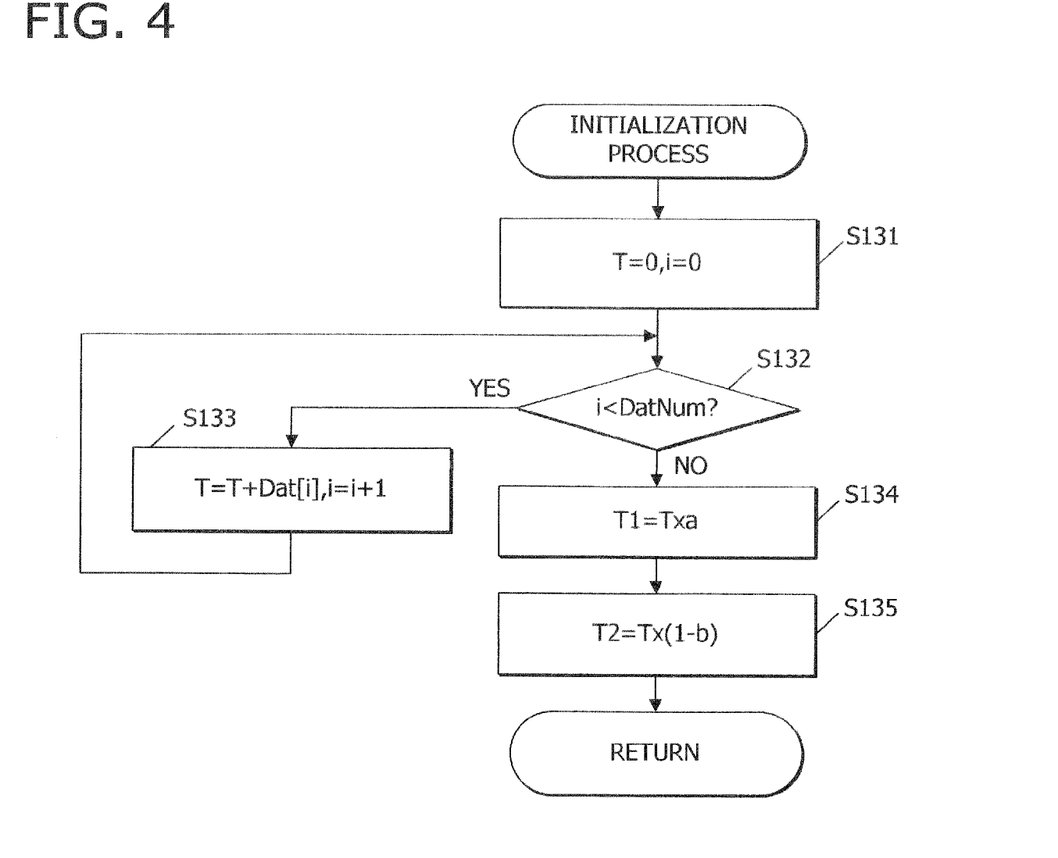
FIG. 4 is a flowchart showing an initialization process of the scanning process.
Figure 5:
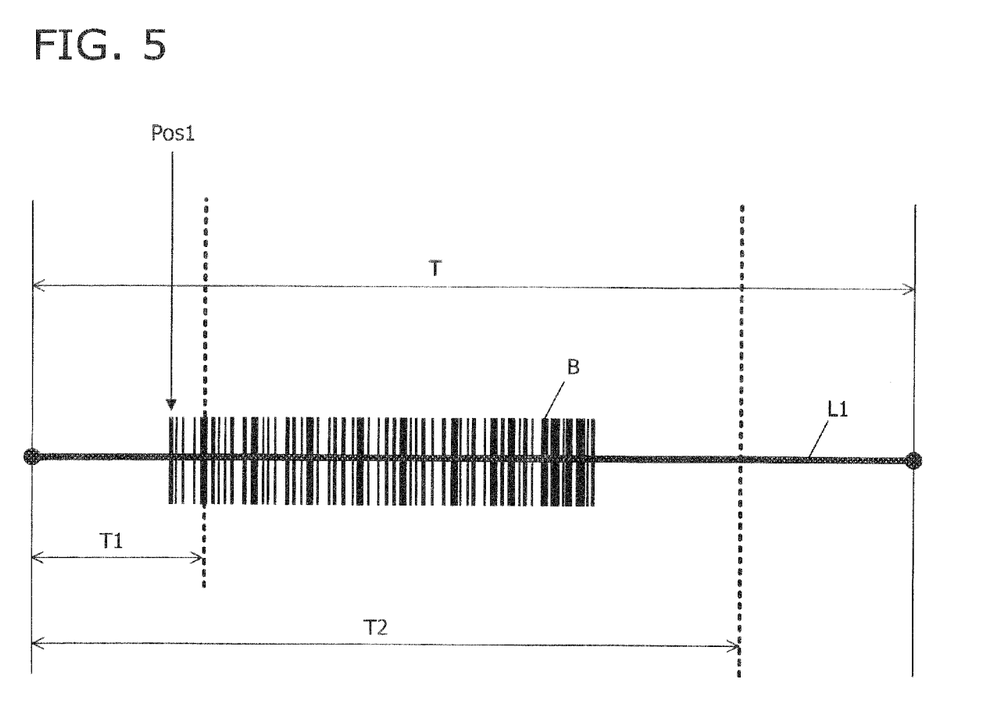
FIG. 5 is a view showing entire image data width, a data unstable range at the left end, a data unstable and stable range, and a barcode start position concerning a barcode.
Figure 6:
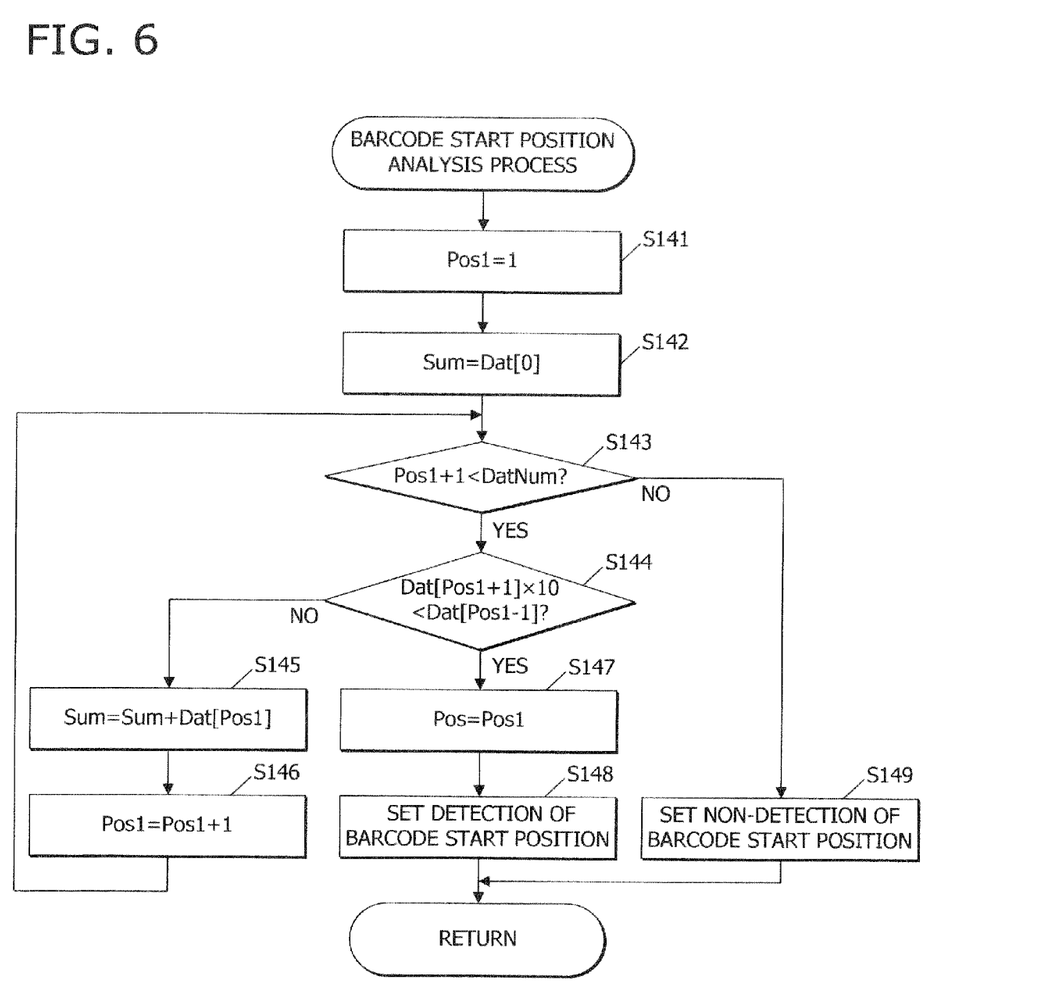
FIG. 6 is a flowchart showing a barcode start position analysis process of the scanning process.
Figure 7:
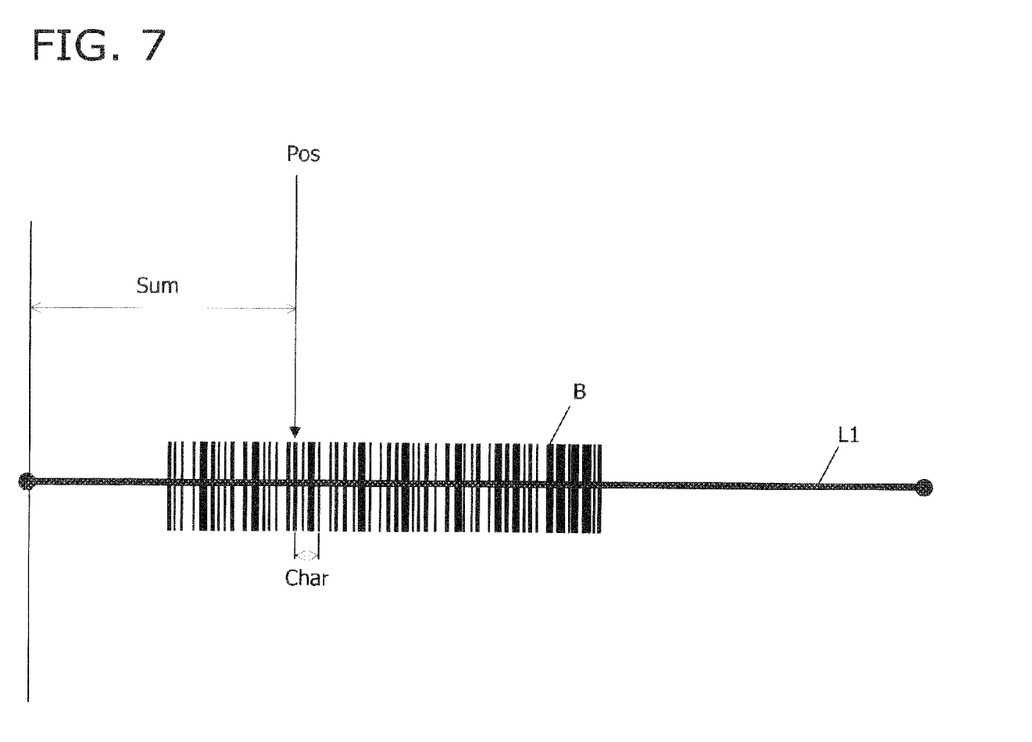
FIG. 7 is a view showing data width of one character, a character start position, and data width between the left end and the character start position concerning the barcode.
Figure 8:
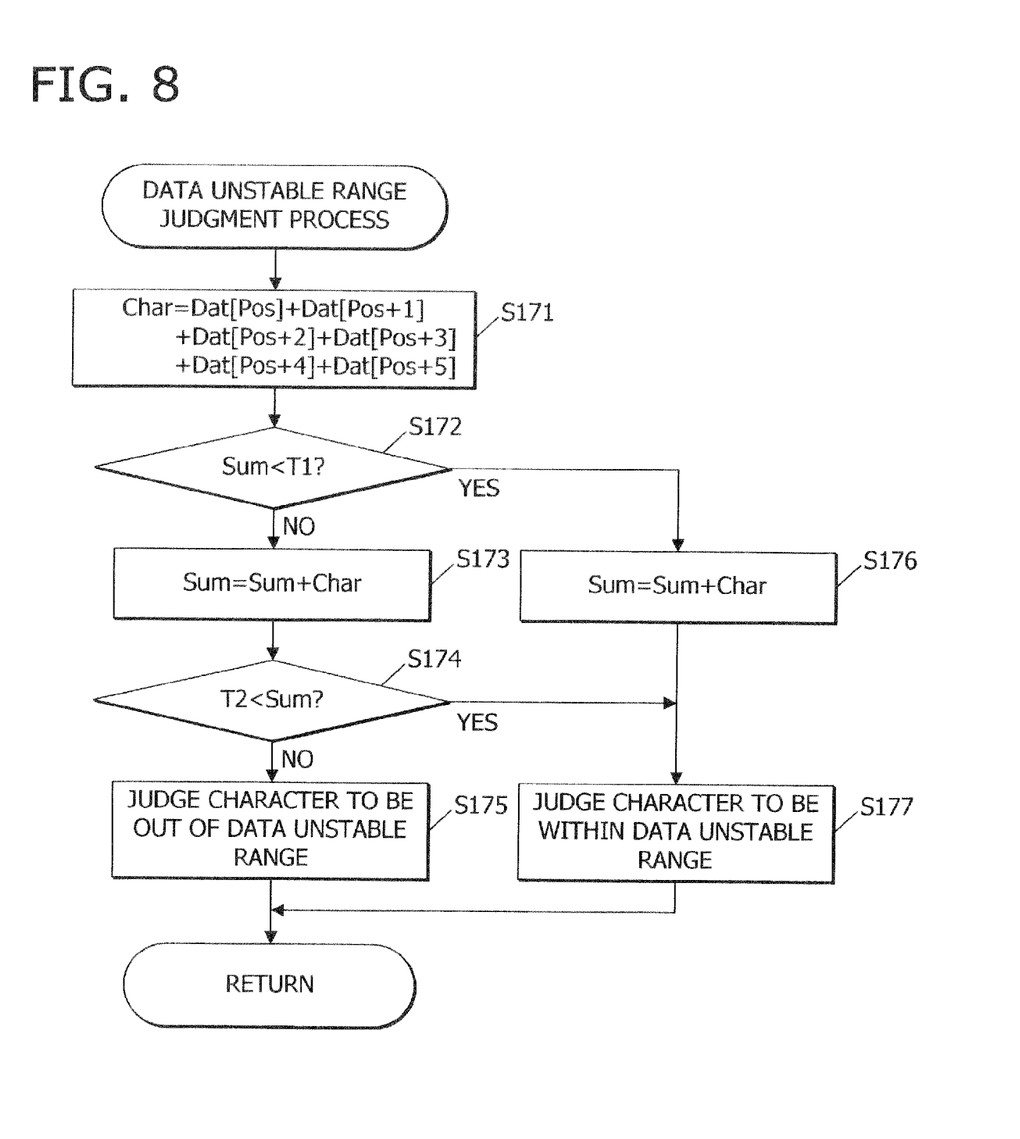
FIG. 8 is a flowchart showing a data unstable range judgment process of the scanning process.
Figure 9:
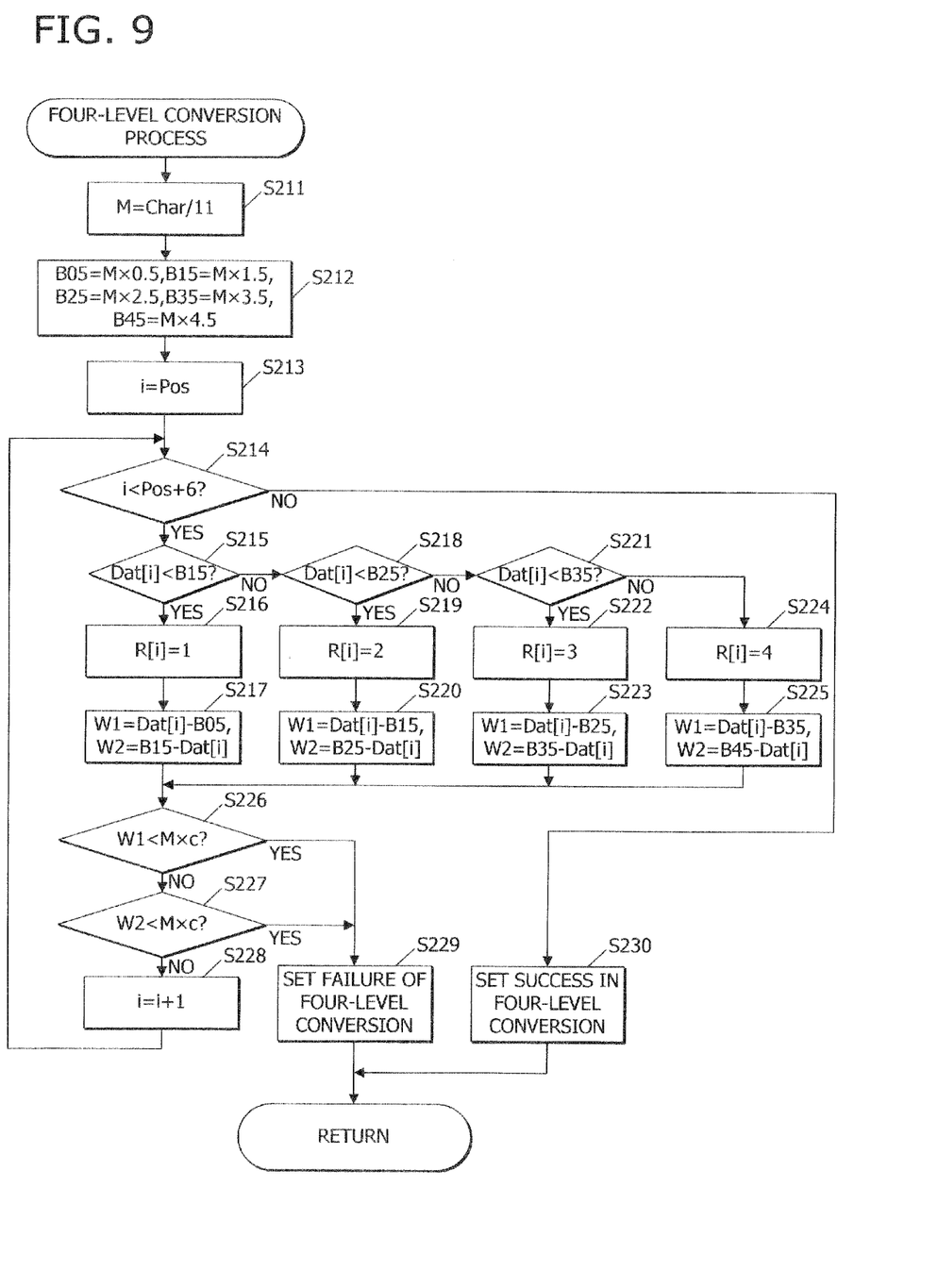
FIG. 9 is a flowchart showing a four-level conversion process of the scanning process.

FIG. 3 is a flowchart showing a scanning process. FIG. 4 is a flowchart showing an initialization process of the scanning process. FIG. 5 is a view showing an entire image data width T, a data unstable range T1, a data stable and unstable range T2, and a barcode start position Pos1, concerning a barcode B. FIG. 6 is a flowchart showing a barcode start position analysis process of the scanning process. FIG. 7 is a view showing a data width Char of one character, a character start position Pos, a data width Sum between the left end and the character start position Pos concerning the barcode B. FIG. 8 is a flowchart showing a data unstable range judgment process of the scanning process. FIG. 9 is a flowchart showing a four-level conversion process of the scanning process.

The scanning process executed by the barcode reader 10 is a process to scan a barcode of the reading target and read information thereof. The position and posture of the barcode reader 10 are previously adjusted by a user so that the irradiation direction of the laser beam of the scanner unit 18 is directed to the barcode intended to be read. More specifically, the direction that the laser beam of the scanner unit 18 swings matches the longitudinal direction of the barcode.

Herein, the description is given of an example of reading a barcode of Code 128 as a standard in which each character included in a barcode is composed of six elements (three black bars and three white spaces). However, the invention is not limited to this example. The barcode reader 10 may be configured to read a barcode of a standard, other than Code 128, in which each character included in the barcode is composed of six elements or read a barcode of a standard in which each character is composed of elements more or less than six elements.

In the barcode reader 10, when the user presses down the trigger button for barcode scanning in the operation unit 12 as a trigger, the CPU 11 executes the scanning process in cooperation with the scanning program 151 properly loaded from the ROM 15 into the RAM 13. The CPU 11 starts the timer at the same time as the start of the scanning process.

First, the CPU 11 judges based on the count value of the timer whether a predetermined time period previously set has elapsed since the start of the scanning process and the timer has timed out (step S11). This predetermined time period is a time-out period to terminate the scanning process. When the timer has timed out (YES in the step S11), the scanning process is terminated.

When the scanning process has not timed out (NO in the step S11), the CPU 11 finishes obtaining image data of a barcode from the scanner unit 18 (step S12). It is assumed that the image data includes an array of Dat[0], Dat[1], Dat[2] . . . of data widths of black bars and white spaces arranged from left to right in the image of the barcode. For example, Dat[0] is data width of a white space to the left of the barcode, and Dat[1] is data width of a black bar at the left end of the barcode.

The CPU 11 executes the initialization process for the image data of the barcode obtained at the step S12 (step S13). Herein, with reference to FIGS. 4 and 5, the initialization process at the step S13 is described. The CPU 11 first sets a variable T representing the data width of the image data to 0 and sets a loop counter i to 0 (step S131). The CPU 11 judges whether the loop counter i is smaller than the number DatNum of black bars and white spaces of the image data obtained at the step 12 (step S132), or not.

When i<DatNum (YES in the step S132), the CPU 11 adds the array Dat [i] to the variable T to calculate a new variable T and then increments the loop counter i by 1 (step S133). The process goes to step S132.

When i≥DatNum (NO in the step S132), the CPU 11 multiplies the variable T by a previously set constant "a" to calculate (the width of) the data unstable range T1 (step S134). The CPU 11 then multiplies the variable T by (1−b) to calculate (the width of) the data unstable and stable range T2 (step S135) and terminates the initialization process. Herein, "b" is a constant previously set.

As shown in FIG. 5, at the time of the step S134, the variable T is equal to the entire image data width T of the image data obtained at the step S12. It is assumed that the barcode B is a barcode as a target of the image data reading at the step S12. A trajectory L1 of the swing of the laser beam is a trajectory of the swing of the laser beam which is outputted from the scanner unit 18 to be projected onto paper including the barcode B. The trajectory L1 is configured to cross all the black bars of the barcode B. Moreover, the image data obtained at the step S12 has a length corresponding to the trajectory L1.

The data unstable range T1 has a data width of a range at the left end of the trajectory L1 where decoding is unstable. The data unstable and stable range T2 has a data width of the range obtained by removing the range at the right end of the trajectory L1 where decoding is unstable from the entire image data length T. In other words, the unstable and stable range T2 has a length of the data unstable range T1 plus the data stable range where decoding is stable on the trajectory L1. The data unstable range at the right end of the trajectory L1 has a width of T×b.

The constants "a" and "b" are values representing the proportions of the data unstable ranges in the entire trajectory L1 of the swing of the laser beam, which is 0 to 1.00. The constants "a" and "b" are determined according to the optical characteristics of the scanner unit 18 (barcode reader 10) and speed characteristics of the swing of the laser beam. The constants "a" and "b" are previously stored (included) in the scanning program 151. The speed characteristics of the swing of the laser beam are characteristics that the speed of the swing of the laser beam on the barcode is not constant in the swing width of the laser beam of the scanner unit 18. More specifically, for example, in the case where the laser beam swings from left to right, the speed of the swing of the laser beam on the barcode changes from acceleration, steady speed, then to deceleration. Accordingly, the proportions of the data widths of the black bars and white spaces of the image data may have large error at the both ends of the swing width of the laser beam.

Again in FIG. 3, after execution of the step S13, the CPU 11 executes a barcode start position analysis process (step S14). Herein, with reference to FIG. 6, the barcode start position analysis process at the step S14 is described.

First, the CPU 11 sets a variable Pos1 of the barcode start position to 1 (step S141). The CPU 11 then sets a variable Sum to the array Dat [0] (step S142). The variable Sum is a variable representing width between the left end and the black bar, or the black bar next to the white space on the left, or white space, corresponding to the variable Pos1.

The CPU 11 judges whether the variable Pos1+1 is smaller than the number DatNum (step S143). At the step 143, it is judged whether the variable Pos1+1 is normal and not beyond the right end of the barcode of the image data, or is abnormal and beyond the right end.

When Pos1+1<DatNum (YES in the step S143), it is judged to be normal, and the CPU 11 then judges whether the array Dat[Pos1+]×10 is smaller than the array Dat[Pos1−1] (step S144). At the step S144, it is judged whether the ten times of the array Dat[Pos1+1] is smaller than the array Dat [Pos1−1] corresponding to the element which has the same color and is located on the immediate left of the array Dat [Pos1+1], that is, whether the array Dat [Pos1−1] for the element which has the same color and is located to the left corresponds to a large white space to the immediate left of the barcode of the image data.

When Dat[Pos1+1]×10≥Dat [Pos1−1] (NO at the step S144), the array Dat[Pos1−1] is not a large white space. The CPU 11 then adds the array Dat [Pos1] to the variable Sum to calculate a new variable Sum (step S145). The CPU 11 increments the variable Pos1 by 1 (step S146), and then the process goes to the step S143.

When Dat[Pos1+1]×10<Dat[Pos1−1] (YES at the step S144), the array Dat [Pos1−1] is a large white space. The CPU 11 then sets the variable Pos representing the character start position to the variable Pos1 representing the barcode start position (step S147). As shown in FIG. 7, the variable Pos is a variable representing the character start position which is moved from the barcode start Position Pos1 toward the right in the later-described data unstable range judgment process. The CPU 11 sets detection of the barcode start position (step S148) and terminates the barcode start position analysis process.

When Pos1+1 DatNum (NO in the step S143), it is judged to be abnormal, and the CPU 11 sets non-detection of the barcode start position (step S149) and terminates the barcode start analysis process.

Again in FIG. 3, after execution of the step S14, the CPU 11 judges based on the setting result of the step S14 (the steps S148 and S149) whether the barcode start position is detected (step S15). When the barcode start position is detected (YES in step S15), the CPU 11 judges whether the variable Pos+6 is smaller than the number DatNum (step S16). The numeral 6 added at the step 16 is the number of black bars and white spaces included in each character of the barcode.

When Pos+6<DatNum (YES in the step S16), the CPU 11 executes the data unstable range judgment process (step S17). Herein, with reference to FIG. 8, the data unstable range judgment process of the step S17 is described.

First, the CPU 11 adds up the array Dat[Pos], Dat[Pos+1], Dat[Pos+2], Dat[Pos+3], Dat[Pos+4], and Dat[Pos+5] to calculate a variable Char representing the data width of image data for one character (step S171). The CPU 11 then judges whether the variable Sum is smaller than the data unstable range T1 (step S172). As shown in FIG. 7, the variable Sum is a variable representing data width between the left end and the black bar, or the black bar next to the white space on the left, or white space, at the variable Pos in the image data. At the step S172, it is judged whether the variable Sum representing the data width not including the character at Pos is within the data unstable range T1 on the left side of the trajectory L1.

When Sum≥T1 (NO in the step S172), the variable Sum is judged to be out of the data unstable range T1.

The CPU 11 adds the variable Sum to the variable Char calculated at the step S171 to calculate a new variable Sum (step S173). The CPU 11 judges whether the variable Sum is larger than the data unstable and stable range T2 (step S174). At the step S174, it is judged whether the variable Sum representing the data width including the character at the variable Pos is within the data unstable range on the right side of the trajectory L1.

When T2≥Sum (NO in the step S174), the variable Sum is out of the right data unstable range. The CPU 11 therefore judges that the position of the character corresponding to the current variable Pos is out of the data unstable ranges (within the data stable range) (step S175) and terminates the data unstable range judgment process.

When sum<T1 (YES in the step S172), the variable Sum is within the data unstable range T1. The CPU 11 then adds the variable Char calculated at the step S171 to the variable Sum to calculate a new variable Sum (step S176). The CPU 11 judges whether the position of the character corresponding to the current variable Pos is within the data unstable range (step S177) and terminates the data unstable range judgment process. When T2<Sum (YES in the step S174), the variable Sum is within the right data unstable range, and the process goes to step S177.

In the data unstable range judgment process, when at least a part of the character corresponding to the variable Pos is within the data unstable range T1 or the right data unstable range, the character is judged to be positioned in the data unstable range.

Again in FIG. 3, after execution of the step S17, the CPU 11 judges based on the judgment result at the step S17 (the steps S175 and S176) whether image data for one character (image data for the variable Char corresponding to the variable Pos) is within the data unstable range (step S18).

When the image data for one character is not within the data unstable range (NO in the step S18), the image data for one character is within the data stable range at the center of the trajectory L1, and the CPU 11 sets a variable "c" to 0 (step S19). When the image data for one character is within the data unstable range (YES in the step S18), the CPU 11 sets the variable "c" to 0.25 (step S20). The variable "c" is a parameter representing how much the proportion error of the black bars and white spaces is allowed. The smaller the variable "c", the more the error is allowed in analysis of the image data. In other words, the variable "c" is a variable corresponding to the tolerance of error of the image data allowed for the threshold used to judge the data width of the black bars and white spaces at decoding of the image data.

Subsequently, the CPU 11 performs a four-level conversion judgment process (step S21). With reference to FIG. 9, the four-level conversion judgment process of the step S21 is described. In the standard of Code 128, the data widths of the black bars and white spaces include four types of values (widths). The four-level conversion judgment process is a process to judge using the threshold and variable "c" which one of the four levels of values the data width of each of three black bars and three white spaces is in the image data for one character.

First, the CPU 11 sets a variable M to a value obtained by dividing the variable Char by 11 (step S211). In the standard of Code 128, the image data for each character has a constant data width of 11 modules. At the step S211, the variable Char for one character is divided by 11 to calculate the data width of the image data corresponding to one module as the variable M.

The CPU 11 sets a variable B05 to a value of the variable M multiplied by 0.5; a variable B15 to a value of the variable M multiplied by 1.5; a variable B25 to a value of the variable M multiplied by 2.5; a variable B35 to a value of the variable M multiplied by 3.5; and a variable B45 to a value of the variable M multiplied by 4.5 (step S212). The variables B05, B15, B25, B35, and B45 are variables representing the data width of image data corresponding to 0.5, 1.5, 2.5, 3.5, and 4.5 times the width of one module, respectively. In the four-level conversion judgment process, each of the variables B05, B15, B25, B35, and B45 is used as a threshold to judge the data widths of the black bars and white spaces (for four-level conversion).

The CPU 11 sets the loop counter i to the variable Pos (step S213). The CPU 11 then judges whether the loop counter i is smaller than the variable Pos+6 (step S214). When i<Pos+6 (YES in the step S214), the CPU 11 judges whether the array Dat [i] is smaller than the variable B15 (step S215).

When Dat[i]<B15 (YES in the step S215), the CPU 11 sets an array R[i] to 1 (step S216). The array R[i] includes four levels of data widths of the black bars and white spaces corresponding to the loop counter i. The CPU 11 then sets a variable W1 to a value of the array Dat[i] minus the variable B05 and sets a variable W2 to a value of the variable B15 minus the array Dat[i] (step S217). The variable W1 is a variable representing the distance between the array Dat[i] and the threshold (variable B05, B15, B25, or B35) on the left of the array Dat[i]. The variable W2 is a variable representing the distance between the array Dat[i] and the threshold (variable B15, B25, B35, or B45) on the right of the array Dat[i].

When Dat[i]≥B15 (NO in the step S215), the CPU 11 judges whether the array Dat[i] is smaller than the variable B25 (step S218). When Dat[i]<B25 (YES in the step S218), the CPU 11 sets the array R[i] to 2 (step S219). The CPU 11 sets the variable W1 to a value of the array Dat[i] minus the variable B15 and sets the variable W2 to a value of the variable B25 minus the array Dat[i] (step S220).

When Dat [i] B25 (NO in the step S218), the CPU 11 judges whether the array Dat [i] is smaller than the variable B35 (step S221). When Dat[i]<B35 (YES in the step S221), the CPU 11 sets the array R[i] to 3 (step S222). The CPU 11 sets the variable W1 to a value of the array Dat[i] minus the variable B25 and sets the variable W2 to a value of the variable B35 minus the array Dat[i] (step S223).

When Dat[i]≥B35 (NO in the step S221), the CPU 11 sets the array R[i] to 4 (step S224). The CPU 11 sets the variable W1 to a value of the array Dat[i] minus the variable B35 and sets the variable W2 to a value of the variable B45 minus the array Dat[i] (step S225).

After execution of the steps S217, S220, S223, and S225, the CPU 11 judges whether the variable W1 is smaller than a value obtained by multiplying the variable M by the variable "c" (step S226). When W1>=M×c (NO in the step S226), the variable W1 (array Dat[i]) is within the tolerance of error, and the CPU 11 the judges whether the variable W2 is smaller than the value of variable M multiplied by the variable "c" (step S227).

When W2≥M×c (NO in the step S227), the variable W2 (array Dat[i]) is within the tolerance of error. The CPU 11 then increments the loop counter i by 1 (step S228), and the process goes to the step S214. When W1<M×c (YES in the step S226), the CPU 11 sets failure of four-level conversion of the black bars and white spaces of the one character corresponding to the variable Pos (step S229) and terminates the four-level conversion. When W2<M×c (YES in the step S227), the process goes to the step S229.

When the variables W1 and W2 are small, the difference between the data widths which are supposed to be different in level, such as differences between one module and two modules and two modules and three modules, are small, and the proportions thereof are not clear, thus increasing the possibility of misreading. Accordingly, the failure of four-level conversion is set at the step S229.

When i Pos+6 (NO in the step S214), the CPU 11 sets success in four-level conversion of the black bars and white spaces of one character corresponding to the variable Pos (step S230) and terminates the four-level conversion judgment process.

Again in FIG. 3, the CPU 11 judges according to the results of the four-level conversion of the step S21 (the steps S229 and S230) whether the four-level conversion of the black bars and white spaces of one character corresponding to the variable Pos is successful (step S22). When the four-level conversion is successful (YES in the step S22), the CPU 11 converts the array R[i] of the character obtained by the four-level judgment process of the step S21 to a character code (step S23). The CPU 11 then judges whether the character code converted in the step S23 is the stop code indicating the right end of the barcode (step S24).

When the character code is not the stop code (NO in the step S24), the CPU 11 increments the variable Pos by 6 (step S25), and the process goes to the step S15. When the character code is the stop code (YES in the step S24), the CPU 11 uses the character code converted at the step S23 to perform a checking process such as a check digit and the like. According to the check results, the CPU 11 then judges whether the decoding ended successfully (step S26). The steps S18 to S26 are a series of decoding process.

When the decoding fails (NO in the step S26), the CPU 11 waits for next image data to be inputted from the scanner unit 18 (step S27), and the process goes to the step S11. When the barcode start position is not detected (NO in the step S15), when Pos+6≥DatNum (NO in the step S16), or when the four-level conversion fails (NO in the step S22), the process goes to step S27.

When the decoding is successful (YES in the step S26), the CPU 11 displays the decoding results including the character code obtained at the step S23 in the display unit 14, causes the informing unit 19 to output buzzer sound (step S28), and then terminates the scanning process. In the step S28, the decoding results are stored in the flash memory 17, for example.

According to the embodiment, in image data of the barcode obtained by the scanner unit 18, the barcode reader 10 judges that the end portions of the swing width of the laser beam to be the data unstable ranges and judges the central part other than the data unstable ranges to be the data stable range. The barcode reader 10 sets the tolerance of error of image data low against the threshold used to judge the thicknesses of black bars and white spaces of the barcode (the variables B05, B15, B25, B35, and B45), (to set the variable "c" high) and uses such threshold and tolerance for decoding the data unstable range. The barcode reader 10 sets high (to the normal level) the tolerance of error of image data against the threshold (sets the variable "c" low) and uses such threshold and tolerance for decoding the data stable range. This can improve the accuracy in reading the data unstable range of the barcode and increase the response at reading the data stable range of the barcode.

The barcode reader 10 judges the data width of a predetermined first proportion (variable "a") of the image data obtained by the scanner unit 18 from the left end to be the data unstable range, and judges the data width of a predetermined second proportion (variable "b") of the same from the right end also to be the data unstable range. Accordingly, the data unstable ranges at the right and left ends can be judged by setting the variables "a" and "b" according to the optical characteristics and speed characteristics of the swing of the laser beam of the scanner unit 18. Moreover, the variable "a" can be set not equal to the variable "b" as well as equal to the variable "b".

The barcode reader 10 sets the tolerance of error of the image data constant against the threshold in each character of the barcode, and sets lower the tolerance of error of characters in the data unstable range and on the boundary of the data stable range in the image data obtained by the scanner unit 18. Accordingly, even when the data unstable ranges and the boundary of the stable range are varied, the accuracy in reading characters on the boundaries can be improved.

As discussed above, according to the embodiment of the invention, it is possible to improve the accuracy and response of the barcode reading.

The above description discloses an example in which the computer-readable medium for the programs according to the invention is the ROM 15, however, the invention is not limited to this example.

Another computer-readable medium can be a non-volatile memory such as a flash memory or a portable recording medium such as a CD-ROM.

Moreover, carrier wave is applicable to the invention as the medium providing the data of the programs according to the invention through a communication line.

The description of this embodiment is just an example of the barcode reader and programs according to the invention, and does not limit the invention.

The barcode reader 10 is assumed to be a handy terminal in the above embodiment, but not limited to this.

The barcode reader 10 can be another type of barcode reader such as a PDA (personal digital assistant) including a laser-type scanner and a barcode reader connected to an ECR (electronic cash register).

Moreover, in the above embodiment, the tolerance of error is set to the same value in each character of the barcode, and the tolerance of error for the threshold of characters in the data unstable range and on the boundary of the data stable range is set higher. However, the invention is not limited to this. For example, the tolerance of error for the threshold of characters in the data unstable range and on the boundary of the data stable range may be set higher. The tolerance of error may be set for each element (black bars and white spaces) of the barcode.

It is certain that the detailed configuration and operation of each constituent element of the barcode reader 10 of this embodiment can be properly changed without departing from the spirit of the invention.

The embodiment of the invention is described above, but the scope of the invention is not limited to the aforementioned embodiment and includes the scope of the invention described in claims and the equivalent scope thereof.

What is claimed is:

1. A barcode reader, comprising:
a scanner unit which includes a light emitting unit to emit light and a controllable vibration mirror to reflect the light, wherein the scanner unit scans a barcode by irradiating the barcode with the light reflected by the vibration mirror, such that the light swings in a left to right direction, and by receiving reflection light from the barcode to obtain image data;
a detection unit which detects a start position of the barcode in the image data by analyzing the image data;
a judgment unit which (a) when the detection unit detects the start position of the barcode, judges a portion of the image data obtained by the scanner unit corresponding to each end portion of a swing width of the light in the left to right direction reflected by the vibration mirror as a data unstable range and (b) judges a portion of the image data other than the data unstable range as a data stable range; and
a decoding unit which (c) sets a first tolerance of error of the image data against a threshold in the data unstable range judged by the judgment unit, the threshold being used to judge data widths of black bars and white spaces of the barcode, to decode the data unstable range using the threshold and the first tolerance, and (d) sets a second tolerance of error which is higher than the first tolerance of error of the image data against the threshold in the data stable range judged by the judgment unit to decode the data stable range using the threshold and the second tolerance.

2. The barcode reader according to claim 1, wherein the judgment unit judges the data width of a first predetermined proportion of the image data obtained by the scanner unit from a left end of the swing width of the light in the left to right direction and the data width of a second predetermined proportion from a right end of the swing width of the light in the left to right direction as the data unstable range.

3. The barcode reader according to claim 1, wherein the decoding unit sets the second tolerance of error for one character of the barcode in the image data obtained by the scanner unit, and sets the first tolerance of error for each character within the data unstable range and on a boundary of the data stable range.

4. The barcode reader according to claim 1, wherein the decoding unit sets one of the first tolerance and the second tolerance for each of the black bars and the white spaces of the barcode.

5. A non-transitory computer readable storage medium having a program stored thereon which is readable by a computer of a barcode reader and encodes an instruction to execute computer processing, the program being executable to control the computer to perform functions comprising:
scanning a barcode by irradiating the barcode with light emitted from a light emitting unit and reflected by a controllable vibration mirror, such that the light swings in a left to right direction, and by receiving reflection light from the barcode to obtain image data;
detecting a start position of the barcode in the image data by analyzing the image data;
(a) when the start position of the barcode is detected, judging a portion of the image data obtained by the scanning corresponding to each end portion of a swing width of the light in the left to right direction reflected by the vibration mirror as a data unstable range, and (b) judging a portion of the image data other than the data unstable range as a data stable range; and
(c) setting a first tolerance of error of the image data against a threshold in the data unstable ranges judged by the judging, the threshold being used to judge data widths of black bars and white spaces of the barcode, to decode the data unstable range using the threshold and the first tolerance, and (d) setting a second tolerance of error which is higher than the first tolerance of error of the image data against the threshold in the data stable range judged by the judging to decode the data stable range using the threshold and the second tolerance.

6. A portable device comprising:
a scanner unit which includes a light emitting unit to emit light and a controllable vibration mirror to reflect the light, wherein the scanner unit scans a barcode by irradiating the barcode with the light reflected by the vibration mirror, such that the light swings in a left to right direction, and by receiving reflection light from the barcode to obtain image data;
a detection unit which detects a start position of the barcode in the image data by analyzing the image data;
a judgment unit which (a) when the detection unit detects the start position of the barcode, judges a portion of the image data obtained by the scanner unit corresponding to each end portion of a swing width of the light in the left to right direction reflected by the vibration mirror as a data unstable range and (b) judges a portion of the image data other than the data unstable range as a data stable range;
a decoding unit which (c) sets a first tolerance of error of the image data against a threshold in the data unstable range judged by the judgment unit, the threshold being used to judge data widths of black bars and white spaces of the barcode, to decode the data unstable range using the threshold and the first tolerance, and (d) sets a second tolerance of error which is higher than the first tolerance of error of the image data against the threshold in the data stable range judged by the judgment unit to decode the data stable range using the threshold and the second tolerance; and
a power supply unit comprising a battery and supplying a driving current to the scanner unit, the detection unit, the judging unit, and the decoding unit.

7. The portable device according to claim 6, wherein the judgment unit judges the data width of a first predetermined proportion of the image data obtained by the scanner unit from a left end of the swing width of the light in the left to right direction and the data width of a second predetermined proportion from a right end of the swing width of the light in the left to right direction as the data unstable range.

8. The portable device according to claim 6, wherein the decoding unit sets the second tolerance of error for one character of the barcode in the image data obtained by the scanner unit, and sets the first tolerance of error for each character within the data unstable range and on a boundary of the data stable range.

9. The portable device according to claim 6, wherein the decoding unit sets one of the first tolerance and the second tolerance for each of the black bars and the white spaces of the barcode.

* * * * *